(12) United States Patent
Yoshizumi et al.

(10) Patent No.: US 9,440,298 B2
(45) Date of Patent: Sep. 13, 2016

(54) HELICAL BROACH

(75) Inventors: Naoki Yoshizumi, Akashi (JP); Yoshio Kobayashi, Akashi (JP); Kensuke Kohno, Akashi (JP); Hideyuki Fujiwara, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 405 days.

(21) Appl. No.: 13/818,808

(22) PCT Filed: Aug. 26, 2011

(86) PCT No.: PCT/JP2011/069281
§ 371 (c)(1),
(2), (4) Date: Feb. 25, 2013

(87) PCT Pub. No.: WO2012/026576
PCT Pub. Date: Mar. 1, 2012

(65) Prior Publication Data
US 2013/0156513 A1     Jun. 20, 2013

(30) Foreign Application Priority Data

Aug. 27, 2010 (JP) .................................. 2010-191074

(51) Int. Cl.
*B23D 43/00* (2006.01)
*B23F 21/26* (2006.01)

(52) U.S. Cl.
CPC ............. *B23D 43/005* (2013.01); *B23F 21/26* (2013.01); *Y10T 407/16* (2015.01)

(58) Field of Classification Search
CPC ........... Y10T 407/15; Y10T 407/1685; Y10T 407/1671; Y10T 407/16; B23D 43/02; B23D 43/00; B23D 43/005

USPC ......................................... 407/12, 19, 18, 13
See application file for complete search history.

(56) References Cited

U.S. PATENT DOCUMENTS 2,898,670 A * 8/1959 Pernack .......................... 407/18
3,439,398 A * 4/1969 Jacobson et al. ............... 407/16
(Continued)

FOREIGN PATENT DOCUMENTS

CN            2043146 U      8/1989
CN            1550279 A      12/2004
(Continued)

OTHER PUBLICATIONS

International Search Report dated Sep. 20, 2011, issued for PCT/JP2011/069281 and English translation thereof.
(Continued)

*Primary Examiner* — Sunil K Singh
*Assistant Examiner* — Alan Snyder
(74) *Attorney, Agent, or Firm* — Locke Lord LLP; James E. Armstrong, IV; Brian S. Matross

(57) ABSTRACT

This helical broach forms a twisted groove at the inner circumference of a machined hole of a workpiece by a plurality of cutting teeth, the plurality of cutting teeth include a plurality of circumference cutting teeth which are arranged on the tip-end side of the broach body, and include a plurality of tooth thickness cutting teeth which are arranged on the rear-end side of the broach body. The plurality of tooth thickness cutting teeth include cutting edges and guiding edges, respectively. The tooth thickness cutting tooth positioned closest to the rear-end side of the broach body is provided with the guiding edge instead of the cutting edge at the intersecting ridge part between a rake face and a lateral surface facing one wall surface of both groove wall surfaces of the twisted groove of the workpiece.

3 Claims, 4 Drawing Sheets

(56) References Cited

U.S. PATENT DOCUMENTS

| | | | | |
|---|---|---|---|---|
| 3,795,958 | A | * | 3/1974 | Psenka .................. 407/19 |
| 8,485,763 | B2 | * | 7/2013 | Katsuki .................. 407/18 |
| 2002/0015622 | A1 | * | 2/2002 | Nakamura et al. ............ 407/13 |
| 2003/0103817 | A1 | * | 6/2003 | Berktold et al. ............. 407/18 |

FOREIGN PATENT DOCUMENTS

| CN | 201405140 Y | 2/2010 |
|---|---|---|
| JP | 62-150018 U | 9/1987 |
| JP | 2-145921 U | 12/1990 |
| JP | 6-33627 U | 5/1994 |
| JP | 2000-94215 A | 4/2000 |
| JP | 2002-096219 A | 4/2002 |
| JP | 2003-205421 A | 7/2003 |
| JP | 2007-175814 A | 7/2007 |
| JP | 2007-253298 A | 10/2007 |

OTHER PUBLICATIONS

Office Action mailed Jul. 3, 2014, issued for the Chinese patent application No. 201180040995.9 and English translation of the Search Report.

* cited by examiner

HELICAL BROACH

TECHNICAL FIELD

The present invention relates to a helical broach used for cutting a workpiece, for example, when manufacturing a helical internal gear having a twisted groove at the inner circumference thereof.

Priority is claimed on Japanese Patent Application No. 2010-191074, filed Aug. 27, 2010, the content of which is incorporated herein by reference.

BACKGROUND ART

A planetary internal gear is an example of a helical internal gear. A variety of planetary internal gears are provided as gears for an automatic transmission. However, recently, high quality has been also required of the gears as the quality of automatic transmissions has been enhanced.

A helical broach is used for machining of this helical internal gear. For example, a helical broach where, on an outer-circumferential part of a broach body formed in a shaft shape, a plurality of cutting teeth protruding on the radially outer-circumferential side of the broach body are arranged in a spiral shape which is twisted around the axis of the broach body from the tip-end side of the broach body to the rear-end side thereof has been proposed in PTL 1 mentioned below. In the helical broach, among the above-described cutting teeth, the cutting teeth on the tip-end side of the broach body are roughing teeth (circumference cutting teeth) and the cutting teeth on the rear-end side of the broach body are finishing teeth (the tooth thickness cutting teeth). In the finishing teeth, cutting edges are respectively formed at intersecting ridge parts between rake faces facing the tip-end side of the broach body and lateral surfaces facing any one side in a circumferential direction of the above-described broach body, and guiding edges are respectively formed at intersecting ridge parts between lateral surfaces on the opposite side to the cutting edges and the above-described rake faces.

A helical internal gear having a desired tooth profile is formed by machining a workpiece with the above-described helical broach. Specifically, teeth with a predetermined tooth height are formed at the workpiece by using a roughing tooth group whose height gradually increased and then the teeth are finished to a predetermined tooth thickness by using a finishing tooth group whose thickness gradually increased. When finishing the teeth in a predetermined tooth thickness, first, one lateral surface (a lateral surface on an acute angle side, for example) of the tooth profile is cut in the tooth thickness direction. Then, the other lateral surface (a lateral surface on an obtuse angle side, for example) of the tooth profile is cut in the tooth thickness direction, whereby the tooth profile is finished to desired tooth profile.

PRIOR ART DOCUMENT

Patent Document

[Patent Document 1] Japanese Patent Application, First Publication No. 2007-253298

SUMMARY OF THE INVENTION

Problem to be Solved by the Invention

However, since the number of last teeth applied to a workpiece is changed on the circumference on the rear-end side of a broach body when a helical broach comes off from the workpiece in the final step of machining, the behavior of the helical broach with respect to the workpiece becomes unstable. As a result, the workpiece is overcut by a last finishing tooth, whereby there is a problem in that the accuracy of tooth-trace is decreased.

Especially, in an off-normal type helical broach where adjacent cutting teeth are disposed obliquely with respect to the axis of the broach body, the last teeth disposed along the circumference of the helical broach come off not at the same time but in order, when the helical broach comes off from the workpiece at the final step of machining. Thereby, the above-mentioned problem becomes conspicuous.

The invention has been made under such circumstances. The object of the invention is to provide a helical broach capable of preventing the overcutting of a workpiece by a last finishing tooth from occurring and machining the workpiece with high tooth-trace accuracy.

Means for Solving the Problem

To solve the above-mentioned problems and achieve the object described above, a helical broach of the invention forms a twisted groove at the inner circumference of a machined hole of a workpiece by a plurality of cutting teeth which protrude from an outer-circumferential part of a broach body formed in a shaft shape to the radial outside of the broach body and are arranged in a spiral shape which is twisted around the axis of the broach body from the tip-end side of the broach body to the rear-end side thereof, where the plurality of cutting teeth include a plurality of circumference cutting teeth which are arranged on the tip-end side of the broach body, and include a plurality of tooth thickness cutting teeth which are arranged on the rear-end side of the broach body. The plurality of tooth thickness cutting teeth respectively include cutting edges which are formed at intersecting ridge parts between rake faces facing the tip-end side of the broach body and lateral surfaces facing one wall surface of both groove wall surfaces of the twisted groove of the workpiece, and include guiding edges which are formed at intersecting ridge parts between lateral surfaces on the opposite side to the lateral surfaces provided with the cutting edges and the rake faces. Furthermore, among the tooth thickness cutting teeth, the tooth thickness cutting tooth positioned closest to the rear-end side of the broach body is provided with the guiding edge instead of the cutting edge at the intersecting ridge part between the rake face and the lateral surface facing one wall surface of both groove wall surfaces of the twisted groove of the workpiece.

In the above-configured helical broach, among the plurality of tooth thickness cutting teeth on the rear-end side of the broach body, the tooth thickness cutting tooth positioned closest to the rear-end side of the broach body is provided with the guiding edge instead of the cutting edge. Therefore, the tooth thickness cutting tooth positioned closest to the rear-end side does not have a function of cutting. Subsequently, the tooth thickness cutting tooth positioned closest to the rear-end side, guides the tooth thickness cutting tooth (which is substantially a last finishing tooth) positioned right ahead thereof by the guiding edge.

At the final step of machining where the helical broach comes off the workpiece, the number of the tooth thickness cutting teeth applied to the workpiece is changed on the circumference of the tooth thickness cutting tooth positioned closest to the rear-end side of the broach body, whereby there is a case where the behavior of the helical broach becomes unstable. Even in this case, in the invention, since the tooth thickness cutting tooth positioned closest to the rear-end side of the broach body does not have a function of cutting as described above, overcutting of the workpiece is prevented.

The above-described tooth thickness cutting tooth positioned closest to the rear-end side of the broach body may be formed so as to be retreated in the tooth thickness direction more than the tooth thickness cutting tooth positioned right ahead thereof in a row to which the tooth thickness cutting tooth belongs.

When the cutting performance is deteriorated, these types of helical broach are commonly resharpened. As described above, if the above-mentioned tooth thickness cutting tooth positioned closest to the rear-end side of the broach body is formed so as to be retreated in the tooth thickness direction more than the tooth thickness cutting tooth positioned right ahead thereof, it is possible for the tooth thickness cutting tooth positioned closest to the rear-end side to avoid protruding in the tooth thickness direction more than the tooth thickness cutting tooth positioned ahead thereof even after being resharpened. Thereby, in a case of being resharpened, it is possible to prevent problems, such as overcutting of the workpiece by the tooth thickness cutting tooth positioned closest to the rear-end side of the broach body, in advance.

On the guiding edge of the above-described tooth thickness cutting tooth positioned closest to the rear-end side of the broach body, a negative relief angle $\theta c$ may be formed in the range of $0.5° \leq \theta c \leq 2°$.

By forming the negative relief angle in such range on the guiding edge as described above, the tooth thickness cutting tooth positioned closest to the rear-end side of the broach body can more reliably perform, without cutting the workpiece, a function of guiding the tooth thickness cutting tooth positioned ahead thereof.

Additionally, if the negative relief angle formed on the guiding edge is less than 0.5°, there is a concern that the guiding edge may perform cutting of the workpiece depending on the behavior of the helical broach with respect to the workpiece.

Meanwhile, if the negative relief angle of the guiding edge is larger than 2°, the gap amounts of the tip-end of the guiding edge become increased. Thereby, there is a concern that the guiding edge may not accurately perform the function of guiding.

Among the tooth thickness cutting teeth in a row, the protruding amounts of the second and the third or from the second to the fourth tooth thickness cutting teeth counted from the rear-end side of the broach body in the tooth thickness direction may be set to the same value as the protruding amounts in the tooth thickness direction.

Except the tooth thickness cutting tooth positioned closest to the rear-end side of the broach body, the protruding amounts of two or three tooth thickness cutting teeth in the tooth thickness direction are set to the same value. Subsequently, when the helical broach comes off from the workpiece in the final step of machining, the behavior of the helical broach with respect to the workpiece is stabilized. Thereby, it is possible to form a tooth profile with high accuracy with respect to the workpiece.

Advantage of the Invention

According to the helical broach of the invention, since the tooth thickness cutting tooth positioned closest to the rear-end side of the broach body does not have a function of cutting, it is possible to form the tooth profile with high accuracy without overcutting the workpiece even in the case where, at the final step of machining where the helical broach comes off from the workpiece, the behavior of the helical broach becomes unstable because the number of the tooth thickness cutting teeth applied to the workpiece is changed on the circumference of the tooth thickness cutting tooth positioned closest to the rear-end side of the broach body.

MODE FOR CARRYING OUT THE INVENTION

Figure 1:
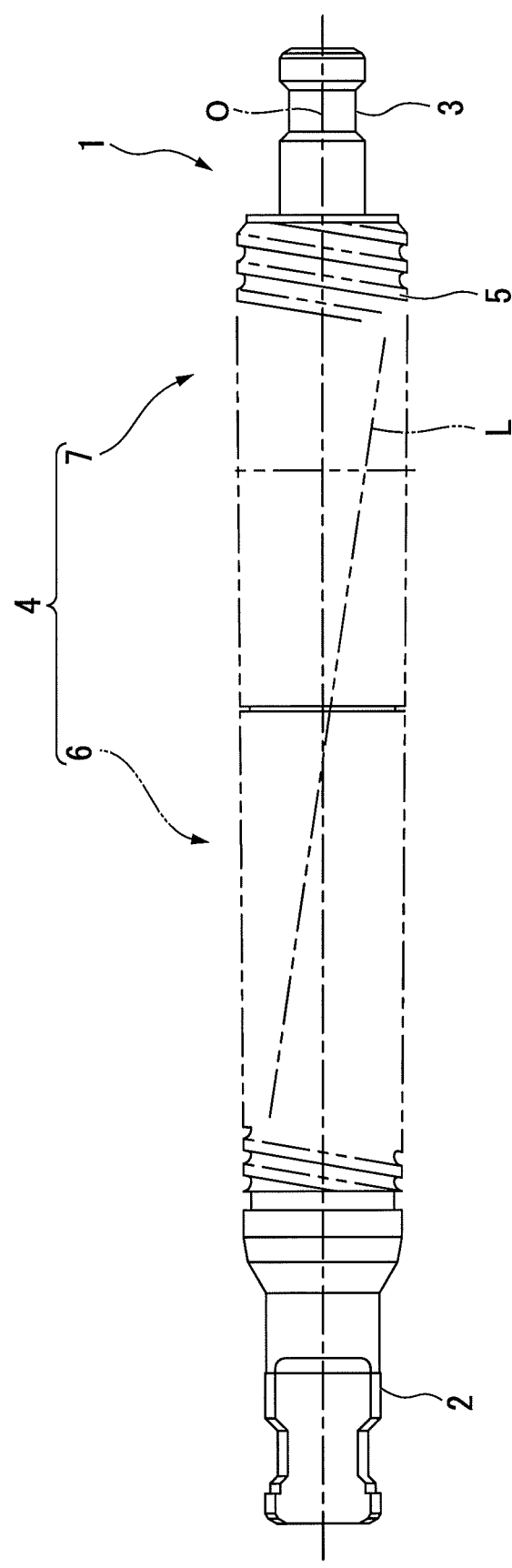
FIG. 1 is a side view showing an embodiment where the invention is employed to an off-normal type helical broach.

FIGS. 1 to 4 show an embodiment of an integral helical broach according to the invention. FIG. 1 is a side view showing the embodiment where the invention is employed to a helical broach. The helical broach of the embodiment performs broaching of a workpiece for manufacturing, for example, the above-mentioned helical internal gear such as a planetary internal gear having a twisted groove at the inner circumference thereof. As shown in FIG. 1, a broach body 1 is a lengthy shaft shape with axis O as a center. Grips 2 and 3 are respectively formed on both end parts of the broach body 1. A cutting tooth portion 4 is formed between the grips 2 and 3. In the cutting tooth portion 4, a plurality of cutting teeth 5 protruding from the outer circumference of the broach body 1 to the radial outside are arranged along a lead L, which is twisted around the axis O from the tip-end side (a left side in FIG. 1) of the broach body 1 to the rear-end side (a right side in FIG. 1), so as to be arranged in a spiral shape. A plurality of rows of the cutting teeth 5 are formed circumferentially spaced apart with intervals.

Additionally, FIG. 1 shows an example where the invention is employed to an integral helical broach of an off-normal type (a helical gullet type) where a plurality of gullets formed between the cutting teeth 5 are twisted around the axis O in the direction of the axis O.

In the cutting tooth portion 4, the plurality of cutting teeth 5 in the portion on the tip-end side of the broach body 1 are circumference cutting teeth 6 which cut the tooth profile of the above-mentioned helical internal gear to the tooth height direction. In the circumference cutting teeth 6, the height of the cutting teeth 5 are gradually increased toward the rear-end side of the broach body 1 along the row of the cutting teeth 5. A plurality of tooth thickness cutting teeth (groove width-enlarging tooth) 7 are provided on the part of the cutting tooth portion 4 positioned closer to the rear-end side of the broach body 1 than the circumference cutting teeth 6. The plurality of tooth thickness cutting teeth 7 cut the tooth profile of the above-mentioned helical internal gear to the tooth thickness direction (that is, a circumferential direction of the broach body 1) so as to be formed in a predetermined tooth thickness. Specifically, tooth surfaces (that is, both groove wall surfaces of the twisted groove of the workpiece) of the tooth profile, which is cut to the predetermined tooth height by the circumference cutting teeth 6, are cut in the tooth thickness direction by the tooth thickness cutting teeth 7. Thereby, the tooth profile of the above-mentioned helical internal gear is formed in the predetermined tooth thickness. In other words, a tooth is formed in the predetermined tooth height by the circumference cutting tooth 6 group whose height gradually increased, and then the tooth is finished to the predetermined tooth thickness by the tooth thickness cutting tooth 7 group whose thickness gradually increased.

In the cutting tooth portion 4, a round tooth to cut the tooth top part of the tooth profile and the tooth thickness cutting tooth 7 may be alternately provided in the portion where the above-described tooth thickness cutting teeth 7 are arranged. Furthermore, the round tooth may be provided on the rear-end side of the tooth thickness cutting tooth 7. In the embodiment, all the cutting teeth 5 of these circumference cutting tooth 6, tooth thickness cutting tooth 7 and the round tooth are integrally formed on the broach body 1.

Figure 2:
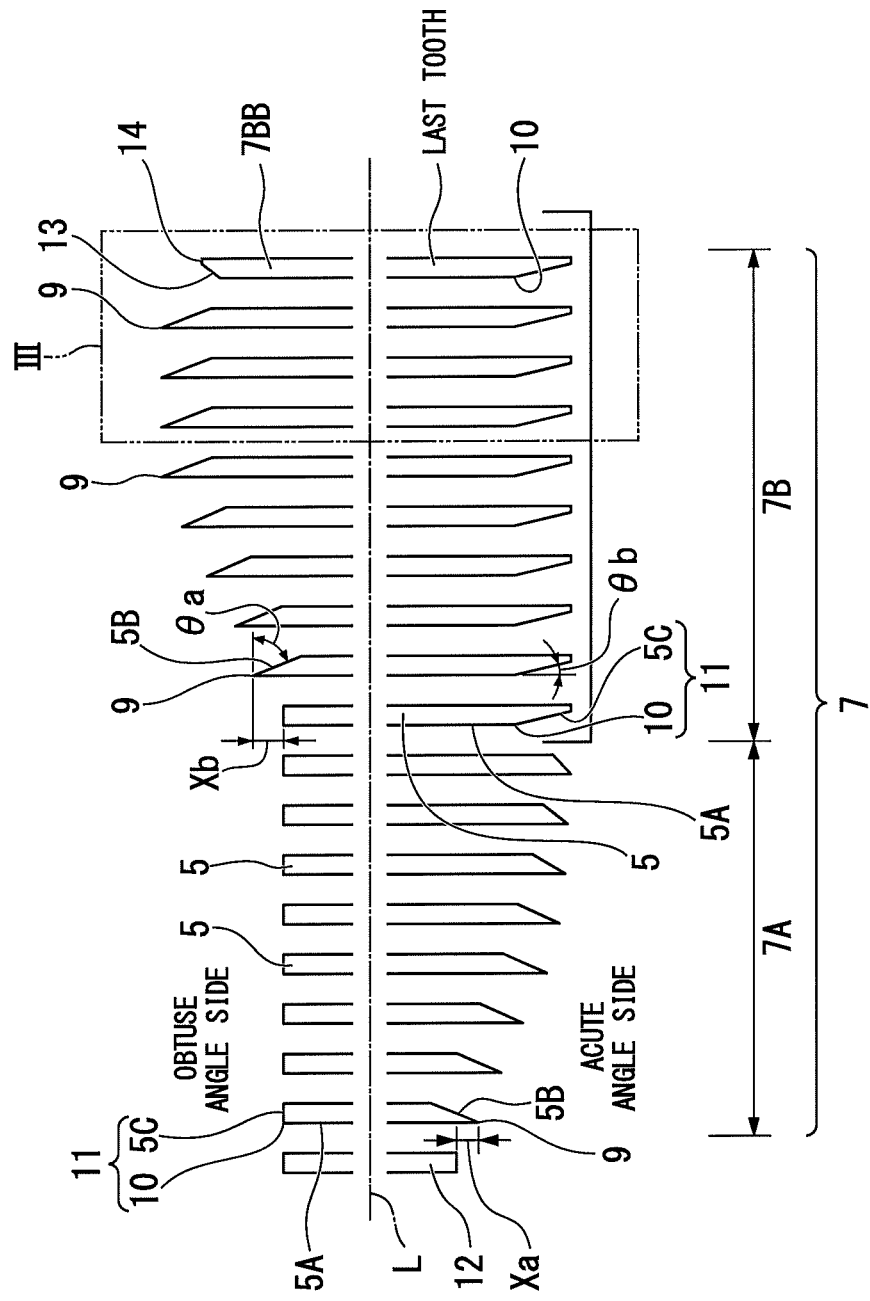
FIG. 2 is a schematic view showing an example of tooth thickness cutting teeth in the embodiment as seen from above.
Figure 3:
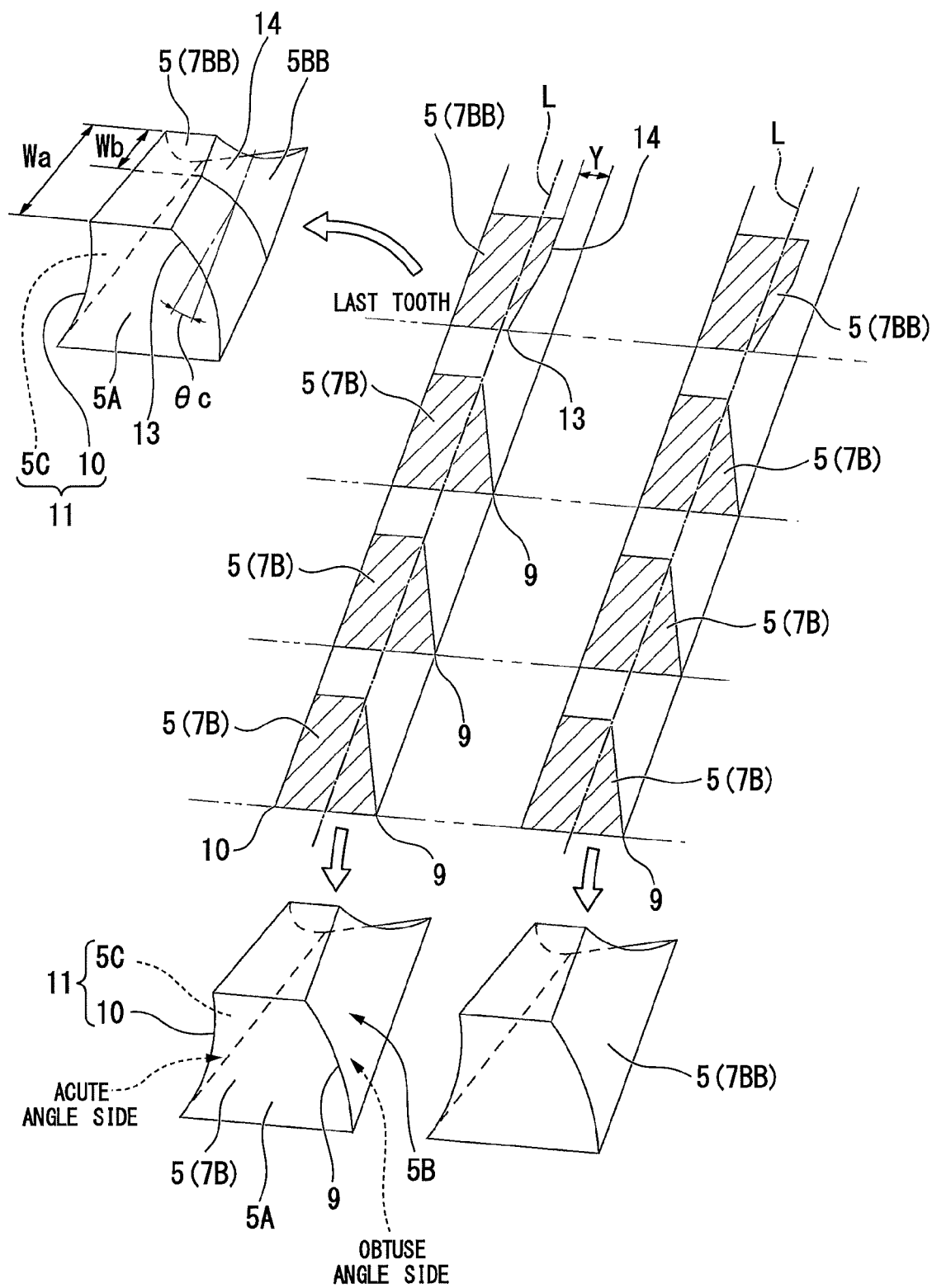
FIG. 3 is a schematic view illustrating, among the tooth thickness cutting teeth, a plurality of tooth thickness cutting teeth on the rear-end side of a broach body.

FIG. 2 is a schematic view showing an example of the tooth thickness cutting teeth 7 in the embodiment as seen from above. FIG. 3 is a schematic view illustrating, among the tooth thickness cutting teeth 7, a plurality of tooth thickness cutting teeth on the rear-end side of the broach body. The plurality of tooth thickness cutting teeth on the rear-end side of the broach body mean a plurality of tooth thickness cutting teeth located in the position indicated by III in FIG. 2. Additionally, the scale of vertical axis is about 10 times the scale of horizontal axis in FIG. 2. Also, the angle of the guiding edge is exaggerated so as to be easily recognized.

As shown in FIG. 2, the above-described plurality of tooth thickness cutting teeth 7 include a plurality of tooth thickness cutting teeth 7A provided on the tip-end side of the broach body 1 so as to follow the circumference cutting teeth 6 and a plurality of tooth thickness cutting teeth 7B provided on the rear-end side of the broach body 1. The plurality of tooth thickness cutting teeth 7A cut one wall surface of both groove wall surfaces of the twisted groove of the workpiece. The plurality of tooth thickness cutting teeth 7B cut the other wall surface of both wall surfaces.

In each of the tooth thickness cutting teeth 7, a cutting edge 9 is formed at the intersecting ridge part between a rake face 5A of the cutting tooth 5 facing the tip-end side of the broach body 1 and a lateral surface 5B facing a groove wall surface to be cut. Meanwhile, a guiding edge 10 is formed at the intersecting ridge part between a guiding surface 5C facing a groove wall surface on the opposite side to the groove wall surface to be cut and the rake face 5A. The guiding edge 10 guides the tooth thickness cutting teeth 7 by coming in sliding contact with the groove wall surface on the opposite side to the above-described groove wall surface to be cut by the cutting edge 9. A guiding part 11 consists of the guiding surface 5C and the guiding edge 10.

In the embodiment, the above-described cutting edge 9 is formed at the intersecting ridge part between the above-described rake face 5A and the lateral surface 5B on an acute angle side (a lower side in FIG. 2) in the tooth thickness cutting tooth 7A on the tip-end side of the broach body 1, as shown in FIG. 2. Furthermore, a lateral surface on an obtuse angle side (an upper side in FIG. 2) is the above-described guiding surface 5C, and the above-described guiding edge 10 is formed at the intersecting ridge part between the guiding surface 5C and the rake face 5A. In this case, a side where the angle formed by the rake face 5A and a straight line parallel with the lead L being through both ends of the rake face 5A is an acute angle is designated as the acute angle side, and a side where the angle formed therebetween is an obtuse angle is designated as the obtuse angle side.

Meanwhile, in each of the tooth thickness cutting teeth 7B on the rear-end side of the broach body 1, the cutting edge 9 is formed at the intersecting ridge part between the rake face 5A and the lateral surface 5B on the obtuse angle side. Furthermore, a lateral surface on the acute angle side is the guiding surface 5C, and the above-described guiding edge 10 is formed at the intersecting ridge part between the guiding surface 5C and the rake face 5A.

On both surfaces of the lateral surface 5B continuing to the above-described cutting edge 9 of the tooth thickness cutting tooth 7 and the lateral surface provided with the guiding surface 5C, a relief angle is formed toward the rear-end side of the broach body 1 with respect to the above-described cutting edge 9 and the guiding edge 10. A positive relief angle $\theta a$ is formed on the lateral surface continuing to the cutting edge 9. A relief angle $\theta b$ of 0° or a negative angle is formed on the lateral surface continuing to the guiding edge 10.

In the plurality of tooth thickness cutting teeth 7A on the tip-end side of the broach body 1, the guiding edge 10 on the obtuse angle side are arranged so as to be continued along the lead L. As coming closer to the rear-end side along the lead L, cutting 9 on the acute angle side are arrayed so as to gradually project in the tooth thickness direction as indicated by a reference sign Xa in FIG. 2.

Meanwhile, in the plurality of tooth thickness cutting teeth 7B on the rear-end side of the broach body 1, the guiding edges 10 on the acute angle side are approximately arranged so as to be continued to, among the above-described plurality of tooth thickness cutting teeth 7A on the tip-end side of the broach body 1, the cutting edge 9 at the last end thereof along the above-described lead L. As the cutting edges on the obtuse angle side come closer to the rear-end side along the lead L from the guiding edges 10 of the tooth thickness cutting teeth 7A on the tip-end side of the broach body 1, they are arrayed so as to gradually project in the tooth thickness direction as indicated by a reference sign Xb in FIG. 2.

As also shown in FIG. 3, among the plurality of tooth thickness cutting teeth 7B on the rear-end side of the broach body 1, the last blade positioned closest to the rear-end side is a tooth thickness cutting tooth 7BB. The tooth thickness cutting tooth 7BB is provided with a guiding edge 13 instead of the cutting edge 9 at the intersecting ridge part between the rake face 5A and a lateral surface 5BB facing one side (the obtuse angle side in the embodiment) in the circumferential direction of the broach body 1. In other words, each of the plurality of tooth thickness cutting teeth 7B on the rear-end side of the broach body is provided with the cutting edge 9 at the intersecting ridge part between the rake face 5A and the lateral surface 5B on the obtuse angle side. However, only the tooth thickness cutting tooth 7BB positioned closest to the rear-end side of the broach body is provided with the guiding edge 13 instead of the cutting edge.

That is, in the tooth thickness cutting tooth 7BB positioned closest to the rear-end side of the broach body, the negative relief angle $\theta c$ is formed on the lateral surface 5BB on the obtuse angle side with respect to the guiding edge 13. Thereby, the guiding edge 13 is formed at the intersecting ridge part between the rake face 5A and the lateral surface 5BB on the obtuse angle side. In this case, the negative relief angle $\theta c$ is set to the range of $0.5° \leq \theta c \leq 2°$.

A flat part 14 parallel to the lead L is formed on the lateral surface on the obtuse angle side where the guiding edge 13 of the tooth thickness cutting tooth 7BB positioned closest to the rear-end side of the broach body is formed (As coming closer to the rear-end, the flat part may be inclined with respect to the lead L so as to narrow to the acute angle side). Thereby, the tooth thickness cutting tooth 7BB is formed so as to be retreated in the tooth thickness direction (more specifically, the direction where the tooth thickness cutting tooth 7B cuts the workpiece) more than the tooth thickness cutting tooth 7B positioned right ahead thereof in a row to which the tooth thickness cutting tooth 7BB belongs.

The retreat amounts Y are set to the value where the tooth thickness cutting tooth 7BB does not project in the tooth thickness direction more than the tooth thickness cutting tooth 7B positioned right ahead thereof even in the case where the cutting tooth 5 is resharpened. Specifically, the retreat amounts Y are set to the appropriate value in the range of $0 < Y \leq 20$ μm.

Furthermore, among the plurality of tooth thickness cutting teeth on the rear-end side of the broach body in a row, the protruding amounts of the second and the third or from the second to the fourth tooth thickness cutting teeth 7B counted from the rear-end side of the broach body in the tooth thickness direction are set to the same value. In other words, in the several tooth thickness cutting teeth 7B positioned on the rear-end side of the broach body except the tooth thickness cutting tooth 7BB, the protruding amounts of the cutting edges 9 on the obtuse angle side are set to the same so as not to project in the tooth thickness direction even in the case of coming closer to the rear-end side along the lead L.

Next, the method of cutting a workpiece by using the helical broach configured as above will be described.

First, the broach body 1 is inserted, from the tip-end side thereof, into a machined hole on the workpiece which is formed in advance. Then, the broach body 1 is relatively rotated and moved forward with respect to the workpiece along the above-described lead L. Thereby, a twisted groove is firstly formed to a predetermined depth by the circumference cutting teeth 6. Next, the guiding edge 10 of each tooth thickness cutting tooth 7A on the tip-end side of the broach body 1 comes in sliding contact with the groove wall surface on the obtuse angle side of the twisted groove and thus the tooth thickness cutting teeth 7A are guided. At this time, the groove wall surface on the acute angle side of the twisted groove is cut by the cutting edge 9 of each tooth thickness cutting tooth 7A on the tip-end side of the broach body 1. Thereby, the finish machining is performed on the groove wall surface on the acute angle side with respect to the groove width.

Subsequently, the guiding edge 10 of each tooth thickness cutting tooth 7B on the rear-end side of the broach body 1 comes in sliding contact with the groove wall surface on the acute angle side and thus the tooth thickness cutting teeth 7B are guided. At this time, the groove wall surface on the obtuse angle side of the twisted groove is cut by the cutting edge 9 of each tooth thickness cutting tooth 7B on the rear-end side of the broach body 1. Thereby, the finish machining is performed on the groove wall surface on the obtuse angle side with respect to the groove width, and the twisted groove in a desired groove width is formed.

In this case, since, among the plurality of tooth thickness cutting teeth 7B on the rear-end side of the broach body, the tooth thickness cutting tooth 7BB positioned closest to the rear-end side is provided with the guiding edge 13 instead of the cutting edge, the tooth thickness cutting tooth 7BB does not have a function of cutting. Therefore, the tooth thickness cutting tooth 7BB positioned closest to the rear-end side of the broach body guides the tooth thickness cutting teeth 7B on the tip-end side of the broach body by the guiding edge 13 thereof.

Subsequently, since the tooth thickness cutting tooth positioned closest to the rear-end side of the broach body does not have a function of cutting as described above, it is possible to form the tooth profile with high accuracy on the workpiece without overcutting the workpiece even in the case where, at the final step of machining where the helical broach comes off from the workpiece, the behavior of the helical broach becomes unstable because the number of the tooth thickness cutting teeth applied to the workpiece is changed on the circumference of the tooth thickness cutting tooth positioned closest to the rear-end side of the broach body.

Figure 4:
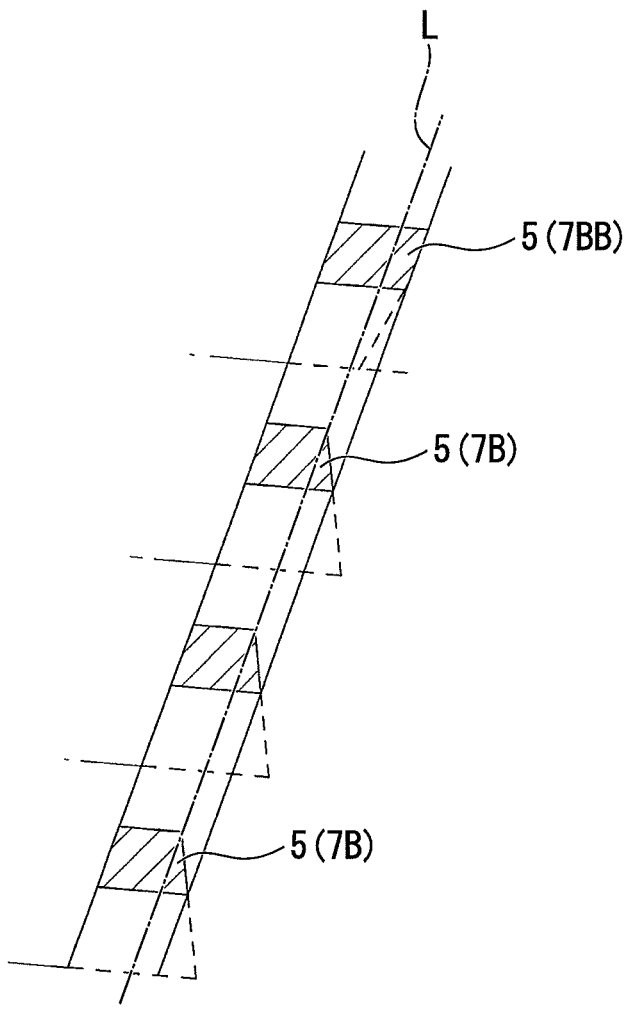
FIG. 4 is a schematic view illustrating the plurality of tooth thickness cutting teeth shown in FIG. 3 in a state of being resharpened.
Figure 4:
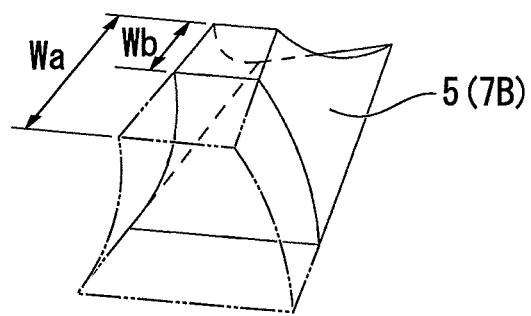

Additionally, in the helical broach of the embodiment, the tooth thickness cutting tooth 7BB positioned closest to the rear-end side of the broach body is formed, so as to be retreated in the tooth thickness direction more than the tooth thickness cutting tooth 7B positioned right ahead thereof in a row to which the tooth thickness cutting tooth 7BB belongs. Therefore, it is possible for the tooth thickness cutting tooth 7BB positioned closest to the rear-end side of the broach body to avoid protruding in the tooth thickness direction more than the tooth thickness cutting tooth positioned ahead thereof, even when, as shown in FIG. 4, the land width Wa of the width finishing tooth 7B and 7BB is narrowed to Wb (1.5 mm, for example) after being resharpened. As a result, in the case of being resharpened, it is possible to prevent problems, such as overcutting of the workpiece by the tooth thickness cutting tooth 7BB positioned closest to the rear-end side of the broach body, in advance.

Furthermore, in the helical broach of the embodiment, the negative relief angle θc is formed on the guiding edge 13 of the tooth thickness cutting tooth 7BB positioned closest to the rear-end side of the broach body and is set to the appropriate value in the range of $0.5° \leq \theta c \leq 2°$. Therefore, the tooth thickness cutting tooth 7BB positioned closest to the rear-end side of the broach body can more reliably perform, without cutting the workpiece, a function of guiding the tooth thickness cutting tooth 7B positioned ahead thereof.

Additionally, in the helical broach of the embodiment, among the plurality of tooth thickness cutting teeth on the rear-end side of the broach body in a row, the protruding amounts of the second and the third or from the second to the fourth tooth thickness cutting teeth counted from the rear-end side of the broach body in the tooth thickness direction are set to the same value. Thereby, when the helical broach comes off from the workpiece in the final step of machining, it is possible to stabilize the behavior of the helical broach with respect to the workpiece. As a result, it is possible to form the tooth profile with even more high accuracy on the workpiece.

The invention is not limited to the above-described embodiment and may be changed in various ways insofar as they are within the scope of the invention.

For example, the example where the invention is employed to an integral helical broach of an off-normal type is described in the embodiment. However, the invention is not limited thereto and may be also employed to a helical broach of an axially-perpendicular gullet type or a helical broach of an assembly type where the tooth thickness cutting teeth 7 are provided in the shell separated from the broach body.

INDUSTRIAL APPLICABILITY

According to the helical broach of the invention, since the tooth thickness cutting tooth positioned closest to the rear-end side of the broach body does not have a function of cutting, it is possible to form the tooth profile with high accuracy without overcutting the workpiece even in the case where, at the final step of machining where the helical broach comes off from the workpiece, the behavior of the helical broach becomes unstable because the number of the tooth thickness cutting teeth applied to the workpiece is changed on the circumference of the tooth thickness cutting tooth positioned closest to the rear-end side of the broach body.

DESCRIPTION OF REFERENCE NUMERALS AND SIGNS

1: BROACH BODY
4: CUTTING TOOTH PORTION
5: CUTTING TOOTH
6: CIRCUMFERENCE CUTTING TOOTH
7: TOOTH THICKNESS CUTTING TOOTH
7A: TOOTH THICKNESS CUTTING TOOTH ON THE TIP-END SIDE OF THE BROACH BODY 1
7B: TOOTH THICKNESS CUTTING TOOTH ON THE REAR-END SIDE OF THE BROACH BODY 1
9: CUTTING EDGE
10: GUIDING EDGE
13: GUIDING EDGE
θc: NEGATIVE RELIEF ANGLE
O: AXIS OF THE BROACH BODY 1
L: LEAD OF CUTTING TOOTH 5

The invention claimed is:

1. A helical broach that forms a twisted groove at the inner circumference of a machined hole of a workpiece by a plurality of cutting edges that protrude from an outer-circumferential part of a broach body formed in a shaft shape to the radial outside of the broach body and are arranged in a spiral shape which is twisted around the axis of the broach body from the tip-end side of the broach body to the rear-end side thereof, wherein the plurality of cutting teeth include a plurality of circumference cutting teeth that are arranged on the tip-end side of the broach body, and include a plurality of tooth thickness cutting teeth that are arranged on the rear-end side of the broach body, the plurality of tooth thickness cutting teeth respectively include cutting edges that are formed at intersecting ridge parts between rake faces facing the tip-end side of the broach body and lateral surfaces facing one wall surface of both groove wall surfaces of the twisted groove of the workpiece, and include guiding edges that are formed at intersecting ridge parts between lateral surfaces on the opposite side to the lateral surfaces provided with the cutting edges and the rake faces, among the tooth thickness cutting teeth, the tooth thickness cutting tooth positioned closest to the rear-end side of the broach body is provided with the guiding edge instead of the cutting edge at the intersecting ridge part between the rake face and the lateral surface facing one wall surface of both groove wall surfaces of the twisted groove of the workpiece, the tooth thickness cutting tooth positioned closest to the rear-end side of the broach body is formed so as to be retreated in the tooth thickness direction more than the tooth thickness cutting tooth positioned right ahead thereof in a row to which the tooth thickness cutting tooth belongs, on the guiding edge of the tooth thickness cutting tooth positioned closest to the rear-end side of the broach body, a negative relief angle $\theta_c$ is formed in the range of $0.5° \leq \theta_c \leq 2°$, and a retreat amount of the tooth thickness cutting tooth positioned closest to the rear-end side of the broach body with respect to the tooth thickness cutting tooth positioned right ahead thereof in a row to which the tooth thickness cutting tooth belongs, is set to a range of 0 to 20 μm.

2. The helical broach according to claim 1, wherein, among the tooth thickness cutting teeth in a row, the protruding amounts of the second and the third or from the second to the fourth tooth thickness cutting teeth counted from the rear-end side of the broach body in the tooth thickness direction are set to the same value.

3. The helical broach according to claim 1, wherein flat surfaces are formed behind surfaces with the negative relief angle $\theta_c$ in a direction toward the rear-end side of the broach body, the flat surfaces being parallel to a lead line or inclined with respect to the lead line such that the flat surfaces come closer to sides free of the negative relief angle $\theta_c$ in the direction toward the rear-end side of the broach body.

* * * * *